J. E. HARROD.
VEHICLE WHEEL.
APPLICATION FILED FEB. 10, 1908.
914,659.
Patented Mar. 9, 1909.
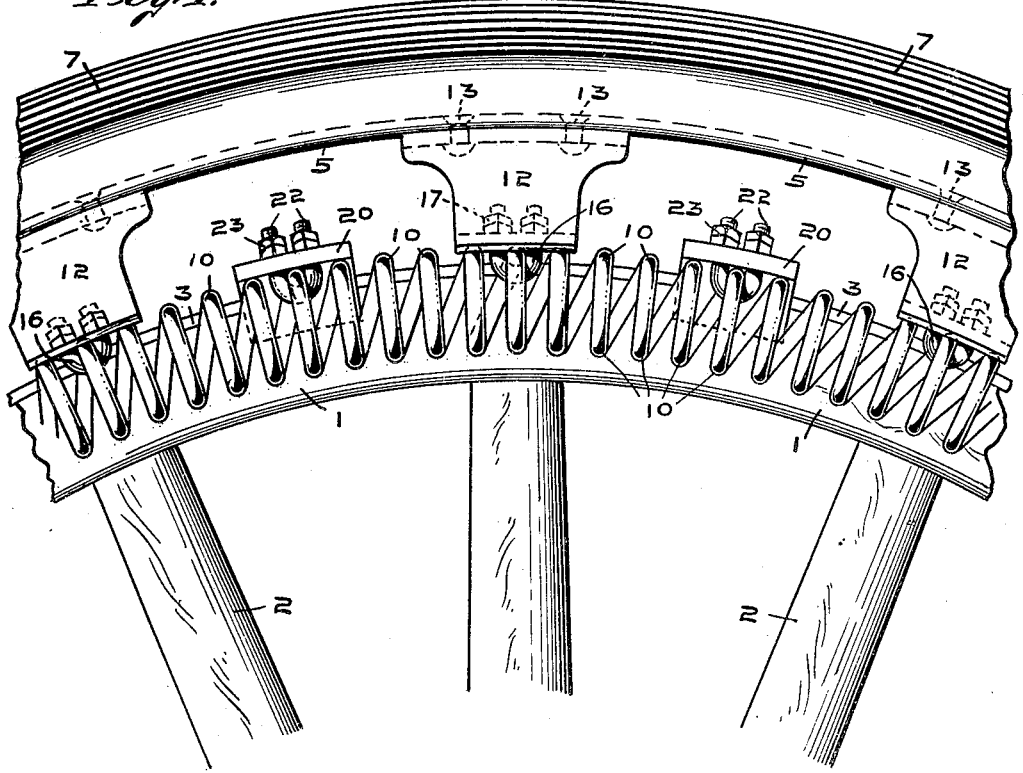
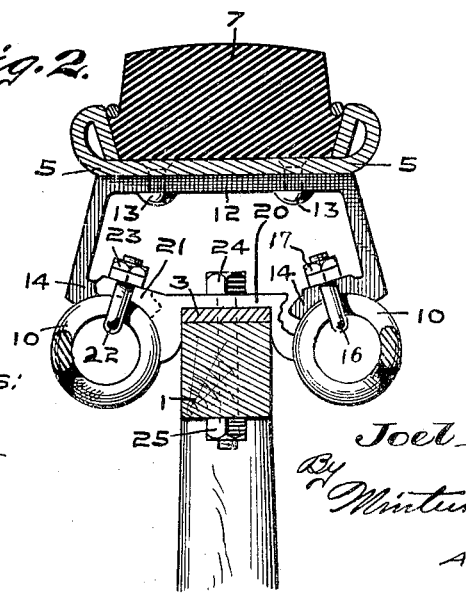

UNITED STATES PATENT OFFICE.

JOEL E. HARROD, OF INDIANAPOLIS, INDIANA.

VEHICLE-WHEEL.

No. 914,659.        Specification of Letters Patent.        Patented March 9, 1909.

Application filed February 10, 1908. Serial No. 415,212.

*To all whom it may concern:*

Be it known that I, JOEL E. HARROD, a citizen of the United States, residing at Indianapolis, in the county of Marion and State of Indiana, have invented certain new and useful Improvements in Vehicle-Wheels, of which the following is a specification.

This invention relates to a yieldable vehicle tire provided with a tread composed of solid rubber, fiber, wood or the like.

The object of the invention is to provide a non-collapsible resilient vehicle tire with a tread formed of firm material which is adapted to be substituted for the pneumatic tire now in general use.

The nature of said invention will appear from the drawings and the following description, which are made a part hereof, in which—

Figure 1 is a detail view in side elevation of my invention. Fig. 2 is a cross section of the construction shown in Fig. 1.

In the drawings, 1 constitutes the wood felly of the wheel, 2 the spokes, and 3 a metallic tire or band surrounding the periphery of said wheel. Surrounding the metallic tire 3 and lying at a greater radius is the tire-plate 5 which is formed out of thin sheet metal which is reinforced at each side by having its edges bent outwardly with a reverse turn so that the edges of the said tire-plate will rest against the outer surface of said plate. These edges provide ribs to strengthen the tire-plate and also form a channel of the latter which receives the tire 7. The tire 7 may be composed of solid rubber, fiber, wood or the like in order to reduce the frictional wear to a minimum. The tire 7 is not depended upon to furnish the desired resiliency for the wheel, this being attained by means of a pair of supporting springs 10 in which one is mounted on each side of the felly 1 and extend circumferentially around the wheel. The tire-plate 5 does not rest directly upon the supporting springs 10, they being separated by means of a plurality of yokes 12 which are equally spaced and are firmly secured to the inner surface of the tire-plate 5 by means of the rivets 13. The extended sides of the yokes terminate in the feet 14 which are formed on a curve to correspond to the external formation of the supporting springs 10, upon which they rest. The tire-plate 5, and the tire 7, are held against circumferential movement by means of the U-shaped bolts 16 that pass through the yokes and around one of the coils of wire forming the supporting springs 10, and the threaded ends of these bolts are provided with the nuts 17. The construction, or formation, of the yokes 12 is best shown in Fig. 2 of the drawings.

The wheel, as before stated, is provided with a pair of supporting springs 10 for supporting and imparting resiliency and yieldability to the outer tire 7. One of these springs lies on each side of the wheel, along the line of the felly 1, and extends circumferentially around said wheel. These supporting springs are retained in their respective positions and relation with the felly 1 by means of a plurality of clips 20 which are provided with a central groove or notch to overhang, or hook over, the metallic tire 3 that rests upon the periphery of the felly 1, which arrangement will prevent lateral movement of said clips. These clips terminate at each side in the curved feet 21 which engage and rest upon the exterior surface of each of the supporting springs 10. The clips 20 are made fast to the springs 10 by means of a plurality of U-shaped bolts 22 which pass through said clips and take over one of the strands of wire forming said supporting springs, and the free ends of said bolts are threaded to receive the nuts 23. The clips 20 are held against circumferential movement by means of the tie-bolts 24 which pass through said clips and through the felly 1 and are provided with the nuts 25.

It will be noted that the supporting springs 10 impart the necessary resiliency to the outer tire 7, and, also, hold it at all times in its proper position. The stress is distributed to both sides of the wheel so that no part will be unduly taxed. When the tread of the tire 7 rests upon the ground and is sustaining the weight the pressure will be applied to the supporting springs 10. The arrangement of the invention is such that a proper distribution of the stress is secured which will prolong its usefulness.

Having thus fully described my said invention, what I desire to secure by Letters Patent, is—

1. The combination, with a vehicle wheel, a tire, a tire-plate circumferentially arranged, at a greater radius, of said wheel, yieldable means arranged at each side of said wheel, a plurality of yokes secured to said tire-plate and adapted to partially surround said yieldable means, and a plurality of clips adapted to partially embrace both the periphery of the wheel and said yieldable means.

2. The combination, with a vehicle wheel, a tire, a tire-plate arranged circumferentially, at a greater radius, of said wheel, coil springs arranged on each side of said wheel, a plurality of non-yieldable yokes secured to said tire-plate and provided with feet adapted to partially embrace said springs, means to secure said yokes and springs together, a plurality of non-yieldable clips provided with feet to partially embrace both the periphery of the wheel and the coil springs, means to secure the clips to the wheel, and means to secure the clips and springs together.

3. The combination, with a vehicle wheel, a tire, a tire-plate provided with reinforced edges and arranged circumferentially of said wheel, an outer tire adapted to be retained by said tire-plate, springs arranged at each side of said wheel, non-yieldable arched yokes secured to said tire-plate and adapted to partially embrace said springs, bolts adapted to secure said yokes to said springs, non-yieldable clips adapted to partially embrace both the periphery of said wheel and springs, and bolts adapted to secure said clips and springs together.

In witness whereof, I, have hereunto set my hand and seal at Indianapolis, Indiana, this, 31st day of January, A. D. one thousand nine hundred and eight.

JOEL E. HARROD. [L. S.]

Witnesses:
F. W. WOERNER,
L. B. WOERNER.